Figure 1:
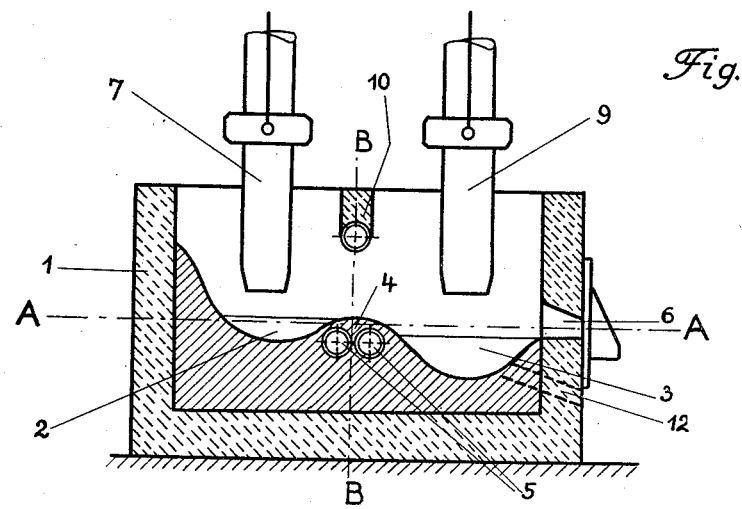

Oct. 24, 1939.  E. WINTER ET AL  2,177,621

PROCESS FOR PREPARING CALCIUM CARBIDE

Filed Aug. 7, 1936

Inventors:
Ernst Winter,
Franz Lückerath,
Paul Windelband, Dec'd by
Hedi Windelband,
Administratrix
By Potter, Pierce & Scheffler,
ATTORNEYS Patented Oct. 24, 1939

2,177,621

UNITED STATES PATENT OFFICE 2,177,621

PROCESS FOR PREPARING CALCIUM CARBIDE

Ernst Winter, Cologne-Braunsfeld, Franz Lückerath, Hermulheim, near Cologne, and Paul Windelband, deceased, late of Knapsack, near Cologne, Germany, by Hedi Windelband, administratrix, assignors to Aktiengesellschaft für Stickstoffdünger, Knapsack, near Cologne-on-the-Rhine, Germany Application August 7, 1936, Serial No. 94,880
In Germany August 9, 1935

2 Claims. (Cl. 23—208)

The present invention relates to a process of preparing calcium carbide and an electric furnace for use therein.

In the preparation of calcium carbide a quantitative result has hitherto not been attained. A product containing about 80 per cent. calcium carbide has in general been regarded as satisfactory. As the rest of the product consists for the most part of lime, it is evident that the formation of calcium carbide has not been completed with the result that there is a considerable loss of raw materials and energy. The reason why the production of only a fraction of the theoretical yield is favoured in the calcium carbide furnace is as follows:

Calcium carbide is prepared by fusing lime and coke, in a proportion stoichiometrically correct for the preparation of pure calcium carbide, in an electric arc-furnace or resistance furnace. It is evident that if the reaction between lime and coke is to be complete it is necessary for the carbon to react with the lime in all the phases of the process in such a manner that the transformation of the raw materials into calcium carbide is complete.

As soon as the starting material in the furnace has been heated to about 2200° C., the lime begins to soften and react with the carbon with evolution of carbon monoxide. The greater the quantity of calcium carbide formed and the higher the percentage of calcium carbide in the fused product the lower becomes the fusing point and viscosity of the mixture wherein the calcium carbide is formed; the minimum fusing point being about 1650° C. Thus as the reaction proceeds, the fluidity of the mixture capable of forming calcium carbide increases and the more fluid portion separates from the coke and flows to the bottom of the furnace. This separation is unfavorable to the further formation of calcium carbide, because the carbon becomes poor in lime, while the lime becomes concentrated at the bottom of the furnace. Even if the power of the furnace is increased calcium carbide can be formed only at a loss, because the percentage of lime in the carbon is low, and the mixture of calcium carbide at the bottom of the furnace is practically free from carbon and is low in calcium carbide. Furthermore owing to this fact the calcium carbide which has already been formed is partly decomposed again by overheating.

These conditions of the reaction can be improved and a calcium carbide of 85 to 95 per cent. strength obtained by dividing the process into at least two stages. This may advantageously be done by fusing the mass in a furnace which contains at least two separate smelting hearths. The hearths may advantageously be at different levels. The mass of calcium carbide thus flows successively into the various hearths. The furnace may be subdivided by a partition which may be cooled so that two divisions are formed each possessing a smelting hearth.

Figure 2:
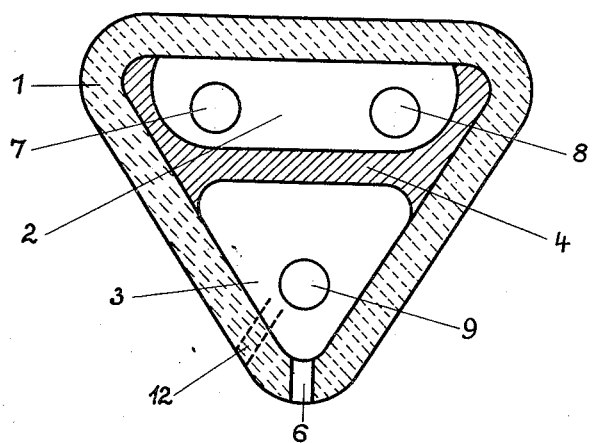
Figure 3:
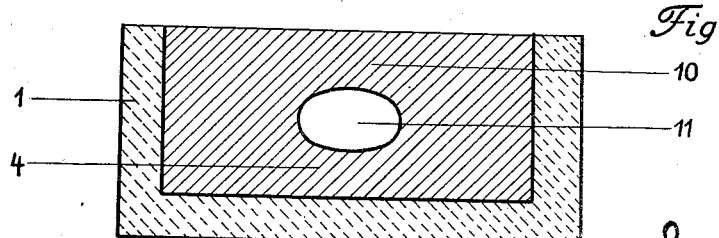

The accompanying drawing illustrates the invention diagrammatically:

Fig. 1 being a vertical cross section of a furnace,
Fig. 2 a horizontal cross section on the line A—A of Fig. 1 and
Fig. 3 a vertical cross section on the line B—B of Fig. 1.

The furnace comprises an exterior wall 1 and two hearths 2 and 3 separated by the sill 4 which may be cooled, for instance by tubes 5 through which the cooling liquid flows. The level of the hearth 3 is lower than that of the hearth 2. The tap hole 6 is situated next to the hearth 3. In the case of a three phase furnace two electrodes 7 and 8 are mounted above the hearth 2, and the third electrode 9 is mounted above the hearth 3. The position of the electrodes is indicated in Fig. 2. Above the sill 4 between the electrodes 7 and 8 on the one hand and the electrode 9 on the other hand is a separating wall 10 which may likewise contain cooling tubes. This wall serves to prevent the mixtures introduced above the hearths from mixing prematurely. The sill 4 and the separating wall 10 may be shaped as is diagrammatically illustrated in Fig. 3 wherein, for simplicity's sake, the cooling tubes have been omitted. In this case the sill 4 and the separating wall 10 are continuous so that the hearths 2 and 3 are only connected by the opening 11.

The hearth 2 is charged with a mixture of lime and carbon in such proportions that a molten mixture containing about 60 to 70 per cent. of calcium carbide flows from the hearth 2 into the hearth 3 through the opening 11. The hearth 3 on the other hand is charged with a large excess of carbon. The calcium carbide of about 60 to 70 per cent. strength flowing into the hearth 3 where there is high concentration of carbon, becomes carburized to such an extent that it is transformed into a calcium carbide of about 85 to 95 per cent. strength.

The furnace is preferably charged in such a manner that in the first hearth the eutectic mixture of calcium carbide and calcium oxide is produced; this mixture contains about 70 per cent. of calcium carbide and 30 per cent. of CaO.

To obtain this mixture there is fed above the first hearth a mixture of about 100 parts by weight of CaO and about 45 to 52 parts by weight of carbon calculated upon the pure materials. The eutectic mixture flows, as described above, into the second hearth where at least the quantity of carbon theoretically sufficient to transform the 30 per cent. of CaO contained in the eutectic mixture into calcium carbide is present. In order to balance any loss it is desirable to add a further quantity of carbon. The quantities of carbon for the second hearth amount to about 16 to 23 parts for each 100 parts by weight of CaO introduced into the first hearth. If a large loss of carbon occurs owing to oxidation by air or other means, for instance the presence of iron oxide or the like, a further quantity of carbon must be added. If the lime contains iron oxide and perhaps also silicon dioxide there is attained with the aid of the furnace herein described a distinct separation of the iron and ferro silicon from the calcium carbide in the second hearth. The calcium carbide is the top layer and a separate tap hole 12 may therefore be provided at the bottom of the second hearth for the iron and ferro-silicon.

We claim:

1. In the process of preparing calcium carbide from calcium oxide and carbon in an electric furnace, the steps which comprise reacting in an upper hearth of the furnace said components in such proportions that a fused product containing lime and about 60 to 70% of calcium carbide is formed, flowing said fused product to a lower hearth of said furnace, adding carbon to the product in said lower hearth in excess of the amount theoretically required to convert the calcium oxide in said product into calcium carbide, and reacting the unreacted calcium oxide and carbon until a final product of at least about 85% calcium carbide content is obtained.

2. The process as defined in claim 1, wherein in the first stage about 100 parts by weight of lime and about 45 to 50 parts by weight of carbon, calculated upon the pure materials, are employed and wherein in the second stage about 16 to 23 parts of carbon for each 100 parts by weight of lime introduced into the first stage are employed.

ERNST WINTER.
FRANZ LÜCKERATH.
HEDI WINDELBAND,
*Administratrix of Paul Windelband, Deceased.*